United States Patent
Zhang et al.

(10) Patent No.: US 11,762,190 B2
(45) Date of Patent: Sep. 19, 2023

(54) HIGH TEMPERATURE RESISTANT REFLECTIVE LAYER FOR WAVELENGTH CONVERSION DEVICES

(71) Applicant: MATERION PRECISION OPTICS (SHANGHAI) LIMITED, Pudong Shanghai (CN)

(72) Inventors: Wen Bo Zhang, Shanghai (CN); Ansheng Liang, Shanghai (CN)

(73) Assignee: MATERION PRECISION OPTICS (SHANGHAI) LIMITED

( * ) Notice: Subject to any disclaimer, the term of this patent is extended or adjusted under 35 U.S.C. 154(b) by 328 days.

(21) Appl. No.: 17/295,961

(22) PCT Filed: Apr. 19, 2019

(86) PCT No.: PCT/CN2019/083523
§ 371 (c)(1),
(2) Date: May 21, 2021

(87) PCT Pub. No.: WO2020/211091
PCT Pub. Date: Nov. 22, 2020

(65) Prior Publication Data
US 2022/0019073 A1 Jan. 20, 2022

(51) Int. Cl.
*G02B 26/00* (2006.01)
*F21V 9/45* (2018.01)
(Continued)

(52) U.S. Cl.
CPC ............. *G02B 26/007* (2013.01); *F21V 9/45* (2018.02); *G02B 5/0808* (2013.01); *G03B 21/16* (2013.01); *G03B 21/204* (2013.01)

(58) Field of Classification Search
CPC ............................. G02B 26/008; F21V 9/45
See application file for complete search history.

(56) References Cited

U.S. PATENT DOCUMENTS

| | | | |
|---|---|---|---|
| 2013/0286359 A1 | 10/2013 | Motoya et al. | |
| 2016/0123557 A1 | 5/2016 | Xu et al. | |

(Continued)

FOREIGN PATENT DOCUMENTS

| | | |
|---|---|---|
| CN | 104100933 | 10/2014 |
| CN | 104100933 A | 10/2014 |

(Continued)

OTHER PUBLICATIONS

International Search Report and Written Opinion of the International Search Authority; PCT/CN2019/083523; dated Feb. 3, 2020; 7 pages.

(Continued)

*Primary Examiner* — Sean P Gramling
(74) *Attorney, Agent, or Firm* — TUCKER ELLIS LLP (57) ABSTRACT

A wavelength conversion device (100) comprises: a substrate (110), a reflective layer (120) on the substrate (110) and a wavelength conversion layer (130) on the reflective layer (120). The reflective layer (120) comprises a binder (121) and reflective titanium dioxide nanoparticles (122). The nanoparticles (122) have a particle size of about 200 nanometers to about 500 nanometers. The reflective layer (120) has enhanced thermal stability. Methods of manufacture the wavelength conversion device are also disclosed.

20 Claims, 5 Drawing Sheets

(51) Int. Cl.
  *G02B 5/08* (2006.01)
  *G03B 21/20* (2006.01)
  *G03B 21/16* (2006.01)

(56) References Cited

U.S. PATENT DOCUMENTS

| | | | |
|---|---|---|---|
| 2017/0045732 A1 | 2/2017 | Chang et al. | |
| 2018/0348614 A1 | 12/2018 | Zhang | |
| 2019/0049828 A1* | 2/2019 | Maeda | G03B 21/204 |

FOREIGN PATENT DOCUMENTS

| CN | 108628076 | A | 10/2018 |
|---|---|---|---|
| CN | 109073876 | | 12/2018 |
| CN | 109073876 | A | 12/2018 |
| CN | 208297916 | | 12/2018 |
| CN | 208297916 | U | 12/2018 |
| CN | 208297917 | | 12/2018 |
| CN | 208297917 | U | 12/2018 |
| JP | 2012185980 | | 9/2012 |
| JP | 2012185980 | A | 9/2012 |
| JP | 2013250481 | A | 12/2013 |
| JP | 2017517771 | A | 6/2017 |
| JP | 2017527847 | A | 9/2017 |
| JP | 2019501419 | A | 1/2019 |
| JP | 2019032506 | A | 2/2019 |
| TW | I614917 | B | 2/2018 |
| WO | 2011118108 | A1 | 9/2011 |
| WO | 2013111542 | A1 | 8/2013 |
| WO | 2017100996 | | 6/2017 |
| WO | 2018230333 | A1 | 12/2018 |
| WO | 2019056209 | A1 | 3/2019 |

OTHER PUBLICATIONS

International Search Report dated Feb. 3, 2020 for Application Serial No. PCT/CN2019/083523 (4 pages).
Supplemental European Search Report dated Oct. 31, 2022 for Application Serial No. 19924875 (9 pages).
Japanese Search Report dated Nov. 30, 2022 for Application Serial No. 2021-552730 (44 pages).

* cited by examiner

HIGH TEMPERATURE RESISTANT REFLECTIVE LAYER FOR WAVELENGTH CONVERSION DEVICES

This application claims priority to Patent Cooperation Treaty (PCT) Application No. PCT/CN2019/083523, filed Apr. 19, 2019, which is hereby fully incorporated by reference in its entirety.

BACKGROUND

The present disclosure relates to wavelength conversion devices, such as phosphor wheels, having a reflective layer that is resistant to high temperatures. They are thus particularly suitable for use in projection display systems and optical light conversion devices that use solid-state lasers as light sources.

A phosphor wheel can be used to generate light having different wavelengths from a single light source. The wheel comprises a circular substrate with surface segments of different colors. When the wheel is rotated with light (from the light source) incident upon it, the surface segments convert the light into different wavelengths.

For a reflective type phosphor wheel, the substrate reflects the light, and so it is desirable for the reflectance of the substrate to be maximized. An aluminum (Al) coated substrate typically has an average reflectance of 94% for wavelengths of about 420 nm to about 680 nm, whereas a silver (Ag) coated substrate has an average reflectance of 98%.

However, stability and durability are also concerns for reflective type wavelength conversion devices. After hundreds of hours working at a high temperature (greater than 150° C.), burning in the area of laser incidence is observed on Ag-coated substrates. Migration of silver ions in the coating layer at high temperatures may be a cause of this effect. This can lead to around a 9% loss of optical performance.

Organic silicones which have high reflectivity (>95%) have been used to form reflective layers for wavelength conversion devices. However, they have poor thermal stability. At temperatures over 200° C., silicones will degrade, typically begin to turn yellow, and gradually begin to burn. At temperatures over 195° C., the phosphor layer upon the reflective layer also cracks after about 1000 hours. This undesirably leads to a short service lifetime for the phosphor wheel, and the light conversion efficiency has been observed to drop sharply (>10% @ 200° C.) due to thermal quenching. In applications with high brightness (e.g., laser power of 300 W), the operating temperature of the phosphor wheel is expected to be generally more than 200° C., thus making the use of silicones undesirable.

A substrate with high reflectivity throughout its lifespan is desirable. Increasing substrate reflectivity while maintaining and increasing reliable lifetime performance at low cost is also desirable. Such substrates and reflective coatings/layers could advantageously be employed in a variety of applications, such as light tunnels, projection display systems, and optical light conversion devices, such as phosphor wheels, used in such systems.

BRIEF DESCRIPTION

The present disclosure relates to compositions used to form a reflective layer in a wavelength conversion device, such as a phosphor wheel or a color wheel; reflective layers containing certain materials; and wavelength conversion devices containing such reflective layers. Such reflective layers resist temperature degradation at high operating temperatures (e.g. greater than 200° C. and up to 250° C.). Methods for making and using such compositions, layers, and devices are also disclosed herein.

Disclosed in various embodiments herein are wavelength conversion devices, comprising: a substrate; a reflective layer on the substrate; and a wavelength conversion layer on the reflective layer. The reflective layer comprises (A) a binder; and (B) reflective nanoparticles having a particle size of about 200 nanometers to about 500 nanometers.

In some embodiments, the reflective nanoparticles are pure titanium dioxide ($TiO_2$), or aluminum oxide ($Al_2O_3$), or magnesium oxide (MgO). In others, the reflective nanoparticles are titanium dioxide (TiO2) surface modified with an organic alcohol, a siloxane, aluminum oxide (Al2O3), zirconium dioxide (ZrO2), or silicon dioxide (SiO2).

The reflective layer may have a thickness of about 0.05 mm to about 0.15 mm. The weight ratio of the (B) reflective nanoparticles to the (A) binder can be from about 1:2.5 to about 1:0.8.

The binder can be an organic binder or an inorganic binder. Examples of organic binders include silicones, such as octamethyltrisiloxane. Examples of inorganic binders include a sodium silicate.

The reflective layer desirably has at least 95% reflectivity for light having a wavelength from about 420 nm to about 680 nm. The phosphor layer may comprise phosphor particles dispersed in glass, or in a crystal, or in a ceramic material. The substrate may have a disk shape. The wavelength conversion may further comprise a motor for rotating the substrate. The substrate can be a metal, a non-metallic material, or a composite material.

Also disclosed are light projection systems comprising the wavelength conversion devices described herein.

Also disclosed in various embodiments are methods of making a wavelength conversion device, comprising: applying a composition to a substrate to form a reflective layer on the substrate, the composition comprising (A) a binder; and (B) reflective nanoparticles having a particle size of about 200 nanometers to about 500 nanometers; and forming a wavelength conversion layer on the reflective layer.

The composition may have a viscosity of about 0 centipoise (cP) to about 1500 cP as applied to the substrate. The methods may further comprise curing the composition at a temperature of about 85° C. to about 150° C. The composition can be applied by dispensing, spraying, brushing, flowing, coating, or silk printing.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used herein, the terms "excitation light" and "excitation wavelength" refer to input light which is subsequently converted, e.g. light produced by a laser-based illumination source or other light source. The terms "emission light" and "emission wavelength" refer to the converted light, e.g. the resulting light produced by a phosphor which has been exposed to excitation light.

As used herein, the term "inorganic" means the "inorganic" object does not contain any carbon. For avoidance of doubt, the terms "inorganic binder," "inorganic adhesive," "inorganic coating," and "inorganic adhesive" of the present disclosure do not contain carbon.

For reference, the color red usually refers to light having a wavelength of about 780 nanometers to about 622 nanometers. The color green usually refers to light having a wavelength of about 577 nanometers to about 492 nanometers. The color blue usually refers to light having a wavelength of about 492 nanometers to about 455 nanometers. The color yellow usually refers to light having a wavelength of about 597 nanometers to about 577 nanometers. However, this may depend on the context. For example, these colors are sometimes used to label various parts and distinguish those parts from each other.

The present disclosure relates to wavelength conversion devices that include a reflective layer having a certain composition. In particular, the reflective layer comprises (A) a binder, which can be organic or inorganic; and (B) reflective nanoparticles having a particle size of about 200 nanometers to about 500 nanometers, including from about 350 nanometers to about 450 nanometers. These reflective layers will operate at high temperatures (e.g. greater than 200° C. or 250° C.) while maintaining other optical and mechanical parameters such as percentage total reflectivity.

Whether a reflective layer maintains high stability can be determined by either of two methods. In the first method, a phosphor wheel using the reflective layer is placed in an oven and aged at 250° C. The reflectivity is tested every 100 hours for a minimum of 500 hours, and observations are made on whether any cracks are present in the reflective layer. If the reflectivity changes less than 2% between the measurements at 300, 400, and 500 hours, and there are no cracks in the reflective layer, then the reflective layer is considered to have maintained high stability. In the first method, a phosphor wheel using the reflective layer is placed in an oven and aged at 250° C. The conversion efficiency of the phosphor wheel is tested every 100 hours for a minimum of 500 hours, and observations are made on whether any cracks are present in the reflective layer. If the conversion efficiency changes less than 2% between the measurements at 300, 400, and 500 hours, and there are no cracks in the reflective layer, then the reflective layer is considered to have maintained high stability. Only one of these two methods has to be passed for the reflective layer to be considered to have maintained high stability.

Figure 1A:
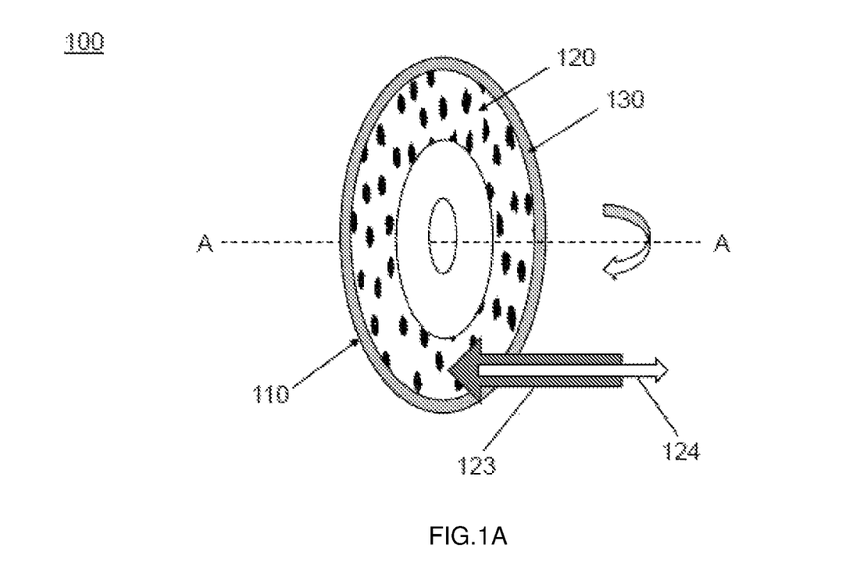
FIG. 1A is a schematic illustration of an exemplary optical light conversion device according to the present disclosure including a substrate, a high-reflectivity layer, and a phosphor layer.
Figure 1B:
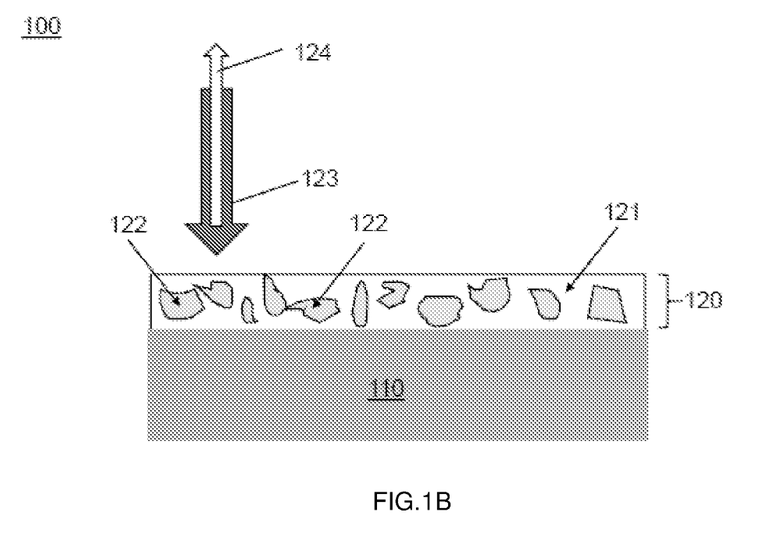
FIG. 1B is a side cross-sectional view of the exemplary optical light conversion device of FIG. 1A.

Turning now to FIG. 1A and FIG. 1B, a wavelength conversion device of the present disclosure is depicted. This wavelength conversion device is illustrated in the form of a phosphor wheel 100. FIG. 1A is a schematic illustration of phosphor wheel 100, and FIG. 1B is a side cross-sectional view of phosphor wheel 100. Phosphor wheel 100 includes a substrate 110 upon which a reflective layer 120 is formed, with a phosphor layer 130 applied over the reflective layer 120. The reflective layer is formed from compositions described further herein. As illustrated here, the reflective layer 120 is formed from an inorganic binder or organic silicone (A) labeled with reference numeral 121, and a reflective nanoparticle labeled with reference numeral 122.

The substrate 110 is typically a metal having a high thermal conductivity, e.g. aluminum or an aluminum alloy, copper or a copper alloy, silver or a silver alloy, or another metal having a high thermal conductivity. The substrate could also, for example, be made of a non-metallic material or a composite material, such as glass, sapphire, or diamond. The substrate is typically in the shape of a disk or a ring. The smoothness or roughness of the substrate surface is not relevant. However, it is desirable that the surface of the substrate on which the reflective layer 120 is formed be clean and have no stains, oils, organic residue, or biological residue thereon. For low-surface energy surfaces, adhesion may be improved by priming or by special surface treatment, such as chemical or plasma etching and ozone cleaning.

The phosphor layer 130 contains at least one phosphor. Examples of suitable phosphors include yttrium aluminum garnet (YAG), silicate, and nitride. The phosphors can have a particle size of from about 10 to about 30 microns. The phosphor layer is normally in the form of annular phosphor segments, which contain different types of phosphor to convert the excitation light to a green, yellow, or red color. Typically, a blue light laser (having a wavelength of about 440 nm to about 460 nm) is used to excite the phosphor segments on the phosphor wheel. The phosphor wheel can also have one or more gaps to pass the blue source light through unconverted.

The phosphor wheel 100 of FIG. 1A and FIG. 1B can be used by mounting the substrate on a motor to rotate with high speed. Typically, the substrate is rotated during use, although this device can also be used in a static (non-rotating) configuration, in which case it may not be known as a phosphor wheel. Rotation of the phosphor wheel is depicted in FIG. 1A by the arrow rotating around axis A-A passing through the substrate 110 and normal to the planar surface of substrate 110. As a result, light of different wavelengths is sequentially generated.

As seen in FIG. 1A and FIG. 1B, excitation light 123 of an excitation wavelength (i.e.; exciting or input light) from a light source (not shown) (e.g., a laser-based illumination source) is focused on the phosphor layer. Emission light 124 of an emission wavelength (i.e., emitted or converted light) is generated by the phosphor layer. In this way, the phosphor layer converts the light spectrum from excitation light of a first range of spectral wavelengths to emission (or re-emission) light of a second, different range of spectral wavelengths. When the light of the excitation wavelength 123 (e.g., laser beam blue light) focuses on the phosphor layer, the light of the emission wavelength 124 (e.g., yellow light) will be emitted in all directions, including towards the substrate. The reflective layer 120 is used to reflect and redirect this emitted light away from the substrate so that it is emitted on the same side of the substrate as that at which the excitation light is received. The emitted light can be collected (e.g. by a lens) and used in subsequent downstream processes.

The reflective layer 120 comprises (A) a binder, which can be organic or inorganic; and (B) reflective nanoparticles having a particle size of about 200 nanometers to about 500 nanometers. In more particular embodiments, the reflective nanoparticles have a particle size of about 350 nanometers to about 450 nanometers.

For the binder (A), a suitable material should be operational over a temperature range of −45° C. to 250° C. (−49° F. to +482° F.) for a long period of time (at least 20,000 hours). Desirably, the binder can be operated at temperatures above 200° C. for such long time periods. The binder (A) can be an organic binder or an inorganic binder.

One example of an organic binder is an organic silicone, such as octamethyltrisiloxane, which is a reflective resin. Such silicones are commercially available from Dow or Sumitomo Chemical. The organic silicone can be mixed with an organic solvent before coating, which may comprise methyl siloxane. One example of an organic solvent is sold by Dow Corning Corporation under the name OS-20. This is a volatile solvent and is used as a diluent to adjust the solution viscosity. The mixed silicone/solvent is made homogeneous according to process requirements, and silicon oil thinner can be added to adjust the viscosity before putting the mixture into a mixing machine for mixing.

Alternatively, the binder (A) can be an inorganic binder that possess certain characteristics. Desirably, the inorganic binder has a coefficient of thermal expansion (CTE) of about 0.5 to about 25 ppm/° C. In particular embodiments, the inorganic binder is sodium silicate. Sodium silicate is the common name for compounds of the formula $(Na_2SiO_3)_n$, and can alternatively be considered a polymer, as seen below in Formula W.

Formula (I)

Sodium silicate has both an anhydrous form and a hydrated form $Na_2SiO_3 \cdot nH_2O$, where n=5, 6, 8, or 9. Sodium silicate can be characterized by the weight ratio of silicon dioxide ($SiO_2$) to sodium oxide ($Na_2O$). The weight ratio of $SiO_2$:$Na_2O$ may vary from 2:1 to 3.75:1. In particular embodiments, the weight ratio of $SiO_2$:$Na_2O$ is from about 2.5:1 to about 3.75:1, or about 2:1 to about 3:1. Sodium silicate is typically provided as an aqueous solution.

In other embodiments, the inorganic binder can be made from other inorganic materials besides sodium silicate. Those inorganic materials can be silicates, aluminates, phosphates, borates, or inorganic sol-gels. Examples of inorganic sol-gels include sol-gels made from silicon dioxide ($SiO_2$) or aluminum oxide ($Al_2O_3$).

In another example embodiment, the inorganic binder is formed from first and second components. The total dissolved solids (TDS) characteristics of the inorganic binder used is provided in the following table:

| Designation | Appearance | Viscosity (mPa · sec) | Density (g/cm$^3$) | Solids content |
|---|---|---|---|---|
| First Component | Semitransparent liquid | 1~50 | 0.8~1.3 | >10% |
| Second Component | Transparent liquid | 0~50 | 0.6~1.0 | >10% |

This particular inorganic binder is prepared by mixing the first component and the second component and stirring for a period of about 2 to about 3 hours at a temperature of from about 25 to about 30° C. The ratio of the first component to the second component is from about 1:1 to about 7:3.

Desirably, the inorganic binder (A) is substantially optically transparent (e.g., the inorganic binder has a light transmittance of at least 80%, including 90% and up to 98%. This is measured, for example, using a spectrophotometer available from Idea optics at a thickness of about 0.1 to about 0.2 millimeters. In contrast, many inorganic binders are opaque.

In particular embodiments, the inorganic binders of the present disclosure are capable of withstanding high temperatures (e.g., greater than 200° C., including 300° C. or more, and up to 400° C.), have a high light transmittance (e.g., at least 98%), have a high tensile-shear strength (e.g., at least 100 psi at 300° C.), can be applied by a flexible coating process (e.g., dispensing, silk printing, spraying), and have a low curing temperature (e.g., less than 185° C.).

The reflective layer also contains reflective nanoparticles (B) It is believed that the presence of the reflective nanoparticles reduces the shrinkage rate of the binder (A), reducing the formation of cracks and bubbles. This avoids stress during assembly and improves the bonding strength of the reflective layer to the substrate. Ideally, the thermal expansion coefficient of the reflective nanoparticles should be as close as possible to that of the binder (A), and their density should also be as close as possible, to avoid stratification of the ingredients.

The reflective nanoparticles have a particle size of about 200 nanometers to about 500 nanometers, including from about 300 nm to about 500 nm and from about 350 nm to about 450 nm. The reflective nanoparticles may be made of pure titanium dioxide ($TiO_2$), or modified $TiO_2$. The modified $TiO_2$ nanoparticles can be surface modified with an organic alcohol, a siloxane, aluminum oxide ($Al_2O_3$), zirconium dioxide ($ZrO_2$), or silicon dioxide ($SiO_2$). In preferred embodiments, the reflective nanoparticles are pure $TiO_2$.

The weight ratio of the (B) reflective nanoparticles to the (A) binder may be from about 1:2.5 to about 1:0.8, including from about 1:2 to about 1:1. The reflective nanoparticles (B) should be mixed with the binder (A), then this mixture can be refrigerated before use. For example, the nanoparticles can be mixed with the binder twice, each time at 800 rpm for about 2 minutes, before being refrigerated at about 4° C. for about 24 hours. Desirably, the reflective nanoparticles are evenly dispersed throughout this mixture, so that the reflective nanoparticles are also evenly dispersed throughout the reflective layer.

The reflective layer can be formed by applying the mixture of binder (A) and reflective nanoparticles (B) to the substrate. The mixture can be applied by dispensing, spraying, brushing, flowing, pattern coating, or silk printing.

In applications where the mixture is to be applied by dispensing or silk printing, the mixture should have a suitable viscosity of from about 0 to about 1,500 centipoise (cP), including from about 100 to about 800 cP, or from about 100 cP to about 600 cP, of from about 200 to about 500 cP, or from about 1,000 cP to about 1,500 cP. The viscosity is measured using a Brookfield DVE SLVTJ0 viscometer, or according to ASTM D1084. The inorganic binder by itself (i.e. no $TiO_2$ nanoparticles) can also have a suitable viscosity of from about 0 to about 1,500 centipoise (cP), including from about 0 to about 800 cP, or from about 100 cP to about 800 cP.

In some instances, it is contemplated that the reflective layer will be built up over multiple application rounds. For example, in the first round, the mixture of binder (A) and reflective nanoparticles (B) is stirred and then sprayed onto the substrate to form a reflective layer with a thickness of about 0,025 mm to about 0.075 mm. This first layer is then placed at room temperature for about 0.5 hours and then cured at about 85° C. for about 0.5 hours. In the second round, the mixture of binder (A) and reflective nanoparticles (B) is stirred again and then sprayed on top of the first layer, then placed at room temperature for about 0.5 hours and then cured at about 85° C. for about 0.5 hours. This results in the final reflective layer having a total thickness of about 0.05 mm to about 0.15 mm.

The reflective layer desirably is configured to reflect across a wavelength range of about 380 nm to about 800 nm, and more preferably from about 420 nm to about 680 nm. The reflectance of the reflective resin layer is typically at least (or greater than) 90%, and more preferably at least (or greater than) 94%, or 95%, or 96%, or 97%, or 98%, or 99%.

The reflective layer may have a total thickness of about 0.05 mm to about 0.15 mm. In particular embodiments, the reflective layer has a thickness of about 0.7 mm to about 0.12 mm. The thickness will be set in order to maximise the reflectance of light output in the desired wavelength range. A thicker layer provides a higher reflectance, but can also result in long term failure, for example due to peeling or cracking of the reflective layer. Thus, an optimal thickness may be determined by an optimal reflectance and/or some compromise between the reflectance and durability.

The reflective layer is generally distinct (and distinguishable) from the phosphor layer through its composition and/or structure. In particular, the reflective layer is normally significantly more reflective than the phosphor layer. The phosphor layer is normally not reflective. Normally, the reflective layer comprises no wavelength conversion material (e.g. phosphor).

The reflective layers of the present disclosure, containing reflective nanoparticles, can maintain total reflectivity of at least 95% at temperatures above 200° C. They can be cured at relatively low temperatures of 85° C. to 150° C. They exhibit reliable operation under high laser irradiance and temperature. They can also be flexibly made into various sizes, shapes, and thicknesses. They are also capable of withstanding high working temperatures, namely working temperatures in excess of 200° C., and up to 250° C. They can be used in high-power laser projection display systems where the solid-state laser projector can be equipped with laser power from about 60 watts to about 300 watts, including in excess of 100 watts. The working temperature of such devices can reach above 200° C. to enable high luminous brightness.

In some embodiments, the reflective layer 120 can also act as a bonding layer between the substrate 110 and the phosphor layer 130. Alternatively or additionally, a secondary bonding layer (e.g, glue or tape) can also be used to adhere the phosphor layer to the reflective layer. This may be useful for certain solid-state phosphor layers made of, for example, phosphor particles dispersed in glass, or in a crystal, or in a ceramic material.

Figure 1C:
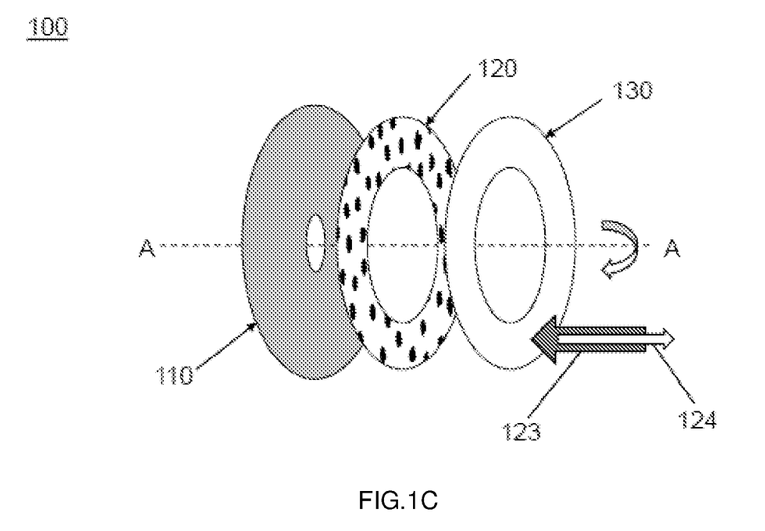
FIG. 1C is an exploded view of the various layers of an optical light conversion device.

Referring back to FIG. 1A and FIG. 1C, it is noted that the width of the reflective layer 120 (measured in the radial direction on the substrate) can vary. In FIG. 1A, the width of the reflective layer 120 is much greater than that of the phosphor layer 130. However, as illustrated in FIG. 1C, the width of the reflective layer 120 can also be roughly equal to the width of the phosphor layer 130. Generally, the width of the reflective layer 120 is at least equal to the width of the phosphor layer 130, and can be greater than the width of the phosphor layer.

It is contemplated that the reflective layers described herein can be used in phosphor wheels and in laser projection display systems. They can also be used in conjunction with a solid-state illumination source, for example in automotive headlights.

The following examples are provided to illustrate the processes of the present disclosure. The examples are merely illustrative and are not necessarily intended to limit the disclosure to the materials, conditions, or process parameters set forth therein.

EXAMPLES

Example 1

Two phosphor wheels having a reflective layer made of inorganic binder and $TiO_2$ nanoparticles were made. The inorganic binder of the reflective layer was formed from first and second components. The total dissolved solids (TDS) characteristics of the inorganic binder used is provided in the following table:

| Designation | Appearance | Viscosity (mPa · sec) | Density (g/cm$^3$) | Solids content |
|---|---|---|---|---|
| First Component | Semitransparent liquid | 1~50 | 0.8~1.3 | >10% |
| Second Component | Transparent liquid | 0~50 | 0.6~1.0 | >10% |

The weight ratio of inorganic binder to TiO$_2$ nanoparticles was 1:1.7. The first wheel, labeled PT01, used TiO$_2$ nanoparticles with a particle size of 0.4-0.45 μm (i.e. 400-450 nm). The second wheel, labeled PT02, used TiO$_2$ nanoparticles with a particle size of 0.36 μm (i.e. 360 nm).

The inorganic binder and TiO$_2$ nanoparticles were mixed two times in a mixing machine, each time was for two minutes at 800 rpm to prepare an inorganic scattering layer material (ISLM).

Interestingly, the ISLM acted as a shear thinning fluid, i.e. its viscosity became smaller when it was stirred. The PT02 powder also easily agglomerated, causing the glue to not be completely absorbed. The ISLM was thus placed in a 4° C. fridge for 24 hours to be sure that the inorganic binder was completely absorbed by the PT02 powder. After 24 hours, the ISLM was stirred by hand softly to be sure that the mixed material was uniform. The viscosity of the ISLM was 1000~1500 centipoise (cP).

The ISLM was applied using an auto-spraying machine (PVA350). The spraying air pressure was adjusted to 3.5 MPa. The ISLM was sprayed on an Al disk twice to obtain a wet reflective layer. The wet layer was placed at room temperature for 0.5 hours and cured at 85° F. for 0.5 hours to obtain a reflective layer having a thickness of 0.045 mm. A second layer was applied on top of the first layer to obtain a reflective layer with a total thickness of 0.09 mm. The reflective layer was cured at 185° F. for 0.5 hours to ensure the layer was completely cured.

Figure 2A:
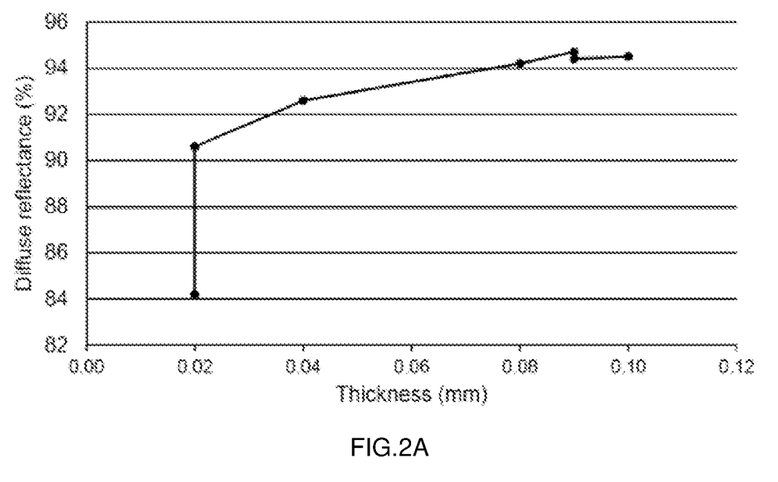
FIG. 2A is a graph showing the relationship between reflectance and the thickness of the reflective layer for a first phosphor wheel of the present disclosure.
Figure 2B:
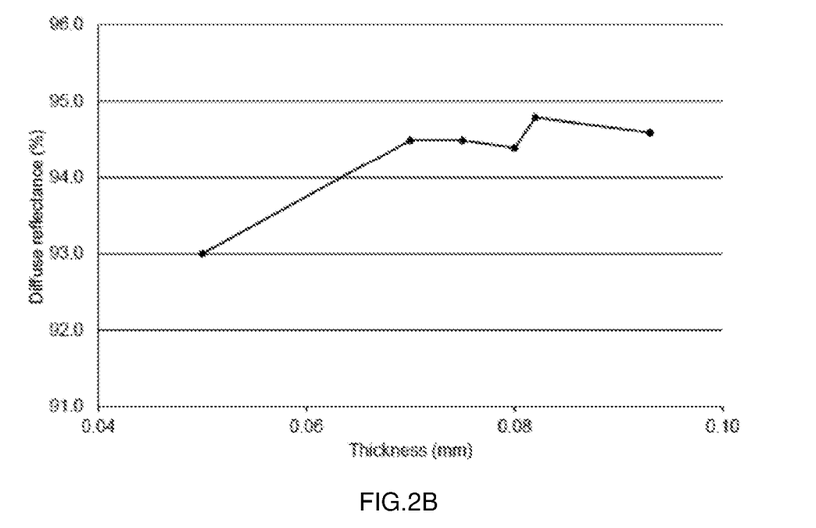
FIG. 2B is a graph showing the relationship between reflectance and the thickness of the reflective layer for a second phosphor wheel of the present disclosure.

First, the diffuse reflectance of the PT01 and PT02 phosphor wheels was measured at different reflective layer thicknesses. The results for the PT01 phosphor wheel are shown in FIG. 2A and the following Table A. The results for the PT02 phosphor wheel are shown in FIG. 2B and the following Table B. As seen in these results, the reflectance stabilized at greater than 94% at thicknesses above 0.08 mm (PT01) or 0.07 mm (PT02).

TABLE A

| PT01 | |
|---|---|
| Thickness (mm) | Diffuse reflectance (%) |
| 0.02 | 84.2 |
| 0.02 | 90.6 |
| 0.04 | 92.6 |
| 0.08 | 94.2 |
| 0.09 | 94.7 |
| 0.09 | 94.4 |
| 0.10 | 94.5 |

TABLE B

| PT02 | |
|---|---|
| Thickness (mm) | Diffuse reflectance (%) |
| 0.050 | 93.0 |
| 0.070 | 94.5 |
| 0.075 | 94.5 |
| 0.080 | 94.4 |
| 0.082 | 94.8 |
| 0.093 | 94.6 |

Next, the two phosphor wheels PT01 and PT02 were compared to two other phosphor wheels. The first comparison wheel, labeled G1 used only the inorganic binder (i.e. no TiO$_2$ nanoparticles) in the reflective layer. The second comparison wheel, labeled G1.5, used only an organic binder (with no TiO$_2$ nanoparticles) in the reflective layer.

An output power test was performed at different thicknesses, comparing the PT02 wheel to the G1 wheel. The results for the PT02 wheel are shown in Table C. In the last column, 100% is the result obtained by the G1 phosphor wheel.

TABLE C

| Thickness (mm) | Diffuse Reflectance (%) | Output Power 100 W | % of G1 |
|---|---|---|---|
| 0.07 | 94.7 | 48.0 | 106.3 |
| 0.08 | 94.7 | 48.2 | 106.6 |
| 0.09 | 94.6 | 48.0 | 106.2 |

Next, a reliability test was performed, comparing the PT02 wheel to the G1 wheel at 100 W and 50 W. Test conditions are shown in Table D. 3 samples were run for each test. The results for the PT02 wheel are shown in Table E. Again, 100% is the result obtained by the G1 phosphor wheel.

TABLE D

| Test | Test Conditions | Time | Criteria |
|---|---|---|---|
| Thermal Shock | −20° C. (0.5 hr) to 200° C. (0.5 hr), 240 cycles | 10 days | 1. No cracks or peeling 2. Output power difference <5% |
| High Humidity | 49° C./95% RH | 10 days | |
| Low Temperature | −20° C. | 10 days | |

TABLE E

| Power Input | Thermal Shock | High Humidity | Output Power % of G1 |
|---|---|---|---|
| 100 W | 106.2% | 105.9% | 106.3% |
| 50 W | 106.1% | 106.1% | 106.2% |

Finally, the PT02 wheel was compared to the G1 wheel at 100 W and 50 W. The samples were placed in a muffle furnace at 250° C., and output performance was tested over time. The results for the PT02 wheel are shown in Table F. Again, 100% is the result obtained by the G1 phosphor wheel. The results showed the PT02 wheel was stable, and no cracks occurred between the reflective layer and the phosphor layer.

TABLE F

| Time (hrs) | 100 W | 50 W |
| --- | --- | --- |
| 0 | 106.3% | 106.2% |
| 115 | 105.9% | 106.0% |
| 206 | 106.3% | 105.8% |
| 349 | 106.1% | 106.1% |
| 513 | 106.0% | 105.9% |

An output power test was performed at different thicknesses, comparing the PT01 wheel to the G1 wheel. The results for the PT01 wheel are shown in Table G. In the last column, 100% is the result obtained by the G1 phosphor wheel.

TABLE G

| Thickness (mm) | Output Power @ 100 W, % of G1 |
| --- | --- |
| 0.08 | 105.7% |
| 0.09 | 106.7% |
| 0.10 | 106.5% |

Next, a reliability test was performed, comparing the PT01 wheel to the G1 wheel at 100 W and 50 W. Test conditions are shown in Table D above. 3 samples were run for each test. The results for the PT01 wheel are shown in Table H. Again, 100% is the result obtained by the G1 phosphor wheel.

TABLE H

| Power Input | Thermal Shock | High Humidity | Low Temp. | Output Power % of G1 |
| --- | --- | --- | --- | --- |
| 100 W | 106.0% | 106.1% | 106.3% | 106.4% |
| 50 W | 106.0% | 105.5% | 106.3% | 106.1% |

Finally, the PT01 wheel was compared to the G1 wheel at 100 W and 50 W. The samples were placed in a muffle furnace at 250° C., and output performance was tested over time. The results for the PT01 wheel are shown in Table I. Again, 100% is the result obtained by the G1 phosphor wheel. The results showed the PT01 wheel was stable, and no cracks occurred between the reflective layer and the phosphor layer.

TABLE I

| Time (hrs) | 100 W | 50 W |
| --- | --- | --- |
| 0 | 106.2% | 106.3% |
| 230 | 106.1% | 106.1% |
| 350 | 106.1% | 106.1% |
| 500 | 105.4% | 106.1% |

Example 2

Diffusivity tests were performed with different types of nanoparticles: $TiO_2$, $Al_2O_3$, and Al. The binder was an inorganic binder. Layers of different thicknesses were made and tested for diffusivity (i.e. diffuse reflectance). Table J describes five different mixtures, and Table K provides the diffusivity results for three of the mixtures. It is noted that a given layer may have different thicknesses due to the hand spraying of the mixtures.

TABLE J

| Mixture # | Particle | Particle size (μm) | Particle amt (g) | Binder amt (g) | Viscosity (cP) |
| --- | --- | --- | --- | --- | --- |
| 1 | $TiO_2$ | | 10 | 20 | ~3000 |
| 2 | $TiO_2$ | | 10 | 26 | 500-1000 |
| 3 | $Al_2O_3$ | 5 | 15 | 18 | 100-200 |
| 4 | $Al_2O_3$ | 5 | 27 | 18 | ~500 |

TABLE K

| Mixture # | Layer Thickness (mm) | Diffusivity (%) |
| --- | --- | --- |
| 2 | 0.05-0.07 | 84-86, 89, 89 |
| 2 | 0.06-0.08 | 89-90 |
| 2 | 0.08-0.09 | 89.5 |
| 2 | >0.08 | 90-92 |
| 2 | >0.1 | 88.9 |
| 3 | 0.1-0.15 | 76-86 |
| 3 | 0.13-0.18 | 91-92 |
| 3 | 0.2-0.3 | 87-89 |
| 3 | >0.2 | 88 |
| 4 | 0.05-0.07 | 89-90 |
| 4 | 0.09 | 91-92 |
| 4 | >0.1 | 92-96 |
| 4 | 0.15-0.17 | 86-94 |
| 4 | 0.18 | 94 |
| 4 | 0.15-0.2 | 89-94 |
| 4 | 0.2 | 95.9 |
| 4 | >0.2 | 94-97 |

The results in Table K indicate that the diffusivity of the $Al_2O_3$ nanoparticles is more than 94% when the layer thickness is over 0.15 mm. However, the reflectivity of $Al_2O_3$ is not stable (i.e. varies greatly), and requires thicknesses greater than that of the $TiO_2$ nanoparticles for the same reflectivity. $Al_2O_3$ is also easy to crack. Thus, it was concluded that $TiO_2$ is the best nanoparticle to use in the high-reflectivity layer.

Example 3

Diffusivity tests were performed with different $TiO_2$ nanoparticles from different suppliers, as well as $Al(OH)_3$ and MgO. The binder was an inorganic binder. Layers of different thicknesses were made and tested for diffusivity. Table L describes six different mixtures, and Table M provides the diffusivity results for five of the mixtures. It is noted that the MgO particles were large, and could not be mixed uniformly.

TABLE L

| Mixture # | Particle | Supplier | Particle size (μm) | Particle amt (g) | Binder amt (g) | Viscosity (cP) |
| --- | --- | --- | --- | --- | --- | --- |
| 5 | $TiO_2$ | PT01 | 0.2 | 18.75 | 22.5 | 200-500 |
| 6 | $TiO_2$ | R960 | 0.5 | 15 | 23 | 100-200 |
| 7 | $TiO_2$ | DHA-100 | 5 | 15 | 27 | Too thick |
| 8 | $TiO_2$ | DHA-100 | 5 | 15 | 33 | Too thick |

TABLE L-continued

| Mixture # | Particle | Supplier | Particle size (μm) | Particle amt (g) | Binder amt (g) | Viscosity (cP) |
|---|---|---|---|---|---|---|
| 9 | Al(OH)$_3$ | Aladdin | 2-10 | 20 | 22.2 | ~500 |
| 10 | MgO | Aladdin | — | 15 | 28 | ~500 |

TABLE M

| Mixture # | Layer Thickness (mm) | Diffusivity (%) | Average (%) |
|---|---|---|---|
| 5 | 0.06-0.07 | 94.1, 93.3, 94.7, 94.8, 94.6 | 94.3 |
| 5 | 0.05-0.07 | 93.2, 93.2, 94.8, 94.4, 94.1 | 93.9 |
| 6 | 0.1 | 93.7, 93.2, 92.8, 93.1, 93.7 | 93.3 |
| 6 | 0.09-1.2 | 89.9, 93.5, 93.8, 91.3, 91.2 | 91.8 |
| 9 | 0.12-0.2 | 83.7, 84.4, 84.2, 85.3, 81.8 | 83.4 |
| 9 | 0.08-0.11 | 83.3, 84.3, 84.8, 83.4, 86.4 | 84.5 |
| 10 | | | 85-87 |

Mixture #5 could obtain a diffusivity of greater than 94%. The results also showed that use of TiO$_2$ nanoparticles at 0.2 μm and 0.5 μm could obtain diffuse reflectance greater than 90%.

The present disclosure has been described with reference to preferred embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A wavelength conversion device, comprising:
   a substrate;
   a reflective layer on the substrate, the reflective layer comprising:
   (A) a binder, wherein the (A) binder is either an organic binder comprising a silicone or an inorganic binder comprising inorganic materials selected from the group consisting of silicates, aluminates, phosphates, borates, and inorganic sol-gels; and
   (B) reflective titanium dioxide (TiO$_2$) nanoparticles that are surface modified with an organic alcohol, a siloxane, aluminum oxide (Al$_2$O$_3$), zirconium dioxide (ZrO$_2$) or silicon dioxide (SiO2), the (B) reflective titanium dioxide (TiO$_2$) nanoparticles having a particle size of about 200 nanometers to about 500 nanometers; and
   a wavelength conversion layer on the reflective layer;
   wherein the reflective layer is thermally stable at operating temperatures up to 250° C.

2. The wavelength conversion device of claim 1, wherein the reflective layer has a thickness of about 0.05 mm to about 0.15 mm.

3. The wavelength conversion device of claim 1, wherein a weight ratio of the (B) reflective titanium dioxide (TiO$_2$) nanoparticles to the (A) binder is from about 1:2.5 to about 1:0.8.

4. The wavelength conversion device of claim 1, wherein the (A) binder is an organic binder comprising octamethyltrisiloxane.

5. The wavelength conversion device of claim 1, wherein the reflective layer has at least 95% reflectivity for light having a wavelength from about 420 nm to about 680 nm.

6. The wavelength conversion device of claim 1, wherein the wavelength conversion layer is a phosphor layer comprising phosphor particles dispersed in glass, or in a crystal, or in a ceramic material.

7. The wavelength conversion device of claim 1, further comprising a motor for rotating the substrate.

8. The wavelength conversion device of claim 1, wherein the substrate is a metal, a non-metallic material, or a composite material; and/or wherein the substrate has a disk shape.

9. A light projection system comprising the wavelength conversion device of claim 1.

10. The wavelength conversion device of claim 1, wherein the (A) binder is an inorganic binder comprising an inorganic sol-gel made from silicon dioxide or aluminum oxide.

11. A method of making a wavelength conversion device, the method comprising:
   applying a composition to a substrate to form a reflective layer on the substrate, the composition comprising:
   (A) a binder, wherein the (A) binder is either an organic binder comprising a silicone or an inorganic binder comprising inorganic materials selected from the group consisting of silicates, aluminates, phosphates, borates, and inorganic sol-gels; and
   (B) reflective titanium dioxide (TiO$_2$) nanoparticles that are surface modified with an organic alcohol, a siloxane, aluminum oxide (Al$_2$O$_3$), zirconium dioxide (ZrO$_2$) or silicon dioxide (SiO$_2$), the reflective titanium dioxide (TiO$_2$) nanoparticles having a particle size of about 200 nanometers to about 500 nanometers;
   curing the composition at a temperature of 85° C. to 150° C.; and
   forming a wavelength conversion layer on the reflective layer,
   wherein the reflective layer is thermally stable at operating temperatures up to 250° C.

12. The method of claim 11, wherein the composition has a viscosity of about 0 centipoise (cP) to about 1500 centipoise (cP).

13. The method of claim 11, wherein the composition is applied by at least one of dispensing, spraying, brushing, flowing, coating, or silk printing.

14. The method of claim 11, further comprising:
   modifying surfaces of the reflective titanium dioxide (TiO$_2$) nanoparticles with the organic alcohol, the siloxane, aluminum oxide (Al$_2$O$_3$), zirconium dioxide (ZrO$_2$), or silicon dioxide (SiO$_2$) prior to applying the composition to the substrate.

15. The method of claim 11, wherein the applying the composition to the substrate to form the reflective layer comprises multiple rounds of application, wherein each round of application comprises:
   applying the composition comprising the (A) binder and the (B) reflective titanium dioxide (TiO$_2$) nanoparticles to the substrate; and
   curing the composition after each round of application,
   wherein the reflective layer is built up over multiple rounds of application to have a thickness of about 0.05 mm to about 0.15 mm.

16. The method of claim 11, wherein a weight ratio of the (B) reflective titanium dioxide (TiO$_2$) nanoparticles to the (A) binder is from about 1:2.5 to about 1:0.8.

17. The method of claim 11, wherein the (A) binder is an inorganic binder comprising an inorganic sol-gel made from silicon dioxide or aluminum oxide.

18. The method of claim 11, wherein the (A) binder is an organic binder comprising octamethyltrisiloxane.

19. The method of claim 11, wherein the (B) reflective titanium dioxide (TiO$_2$) nanoparticles have a particle size of about 350 nanometers to about 450 nanometers.

20. The method of claim 11, further comprising:
 forming the composition by:
  mixing the (A) binder and the (B) reflective titanium dioxide (TiO$_2$) nanoparticles to form a mixture; and
  refrigerating the mixture to form the composition prior to applying the composition to the substrate to form the reflective layer.

\* \* \* \* \*